United States Patent
Park et al.

(10) Patent No.: US 9,371,092 B2
(45) Date of Patent: Jun. 21, 2016

(54) REINFORCING STRUCTURE OF PACKAGE TRAY SIDE MEMBER FOR VEHICLE

(71) Applicant: Hyundai Motor Company, Seoul (KR)

(72) Inventors: Hyeong Gyu Park, Bucheon-si (KR); Byung Jin Kim, Yongin-si (KR); Hee Dae Oh, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 518 days.

(21) Appl. No.: 13/856,961

(22) Filed: Apr. 4, 2013

(65) Prior Publication Data

US 2014/0158567 A1 Jun. 12, 2014

(30) Foreign Application Priority Data

Dec. 12, 2012 (KR) ........................ 10-2012-0144290

(51) Int. Cl.
*B60J 7/00* (2006.01)
*B62D 25/02* (2006.01)
*B62D 25/08* (2006.01)

(52) U.S. Cl.
CPC .............. *B62D 25/02* (2013.01); *B62D 25/087* (2013.01); *B62D 25/088* (2013.01)

(58) Field of Classification Search
CPC .............. B65D 2251/0093; B65D 2251/0018; B65D 81/2076; A61F 2/0095; A61B 2017/06142; A61B 17/06133; A61B 2019/0219; H01L 2924/00014; H01L 2924/00; H01L 2224/48091
USPC ........................................ 296/203.04, 193.08
See application file for complete search history.

(56) References Cited

U.S. PATENT DOCUMENTS

| | | | | |
|---|---|---|---|---|
| 6,648,401 B2 * | 11/2003 | Behnke | .............. | B62D 25/2036 296/198 |
| 8,118,341 B2 * | 2/2012 | Taneda | .................. | B62D 21/152 296/187.08 |
| 8,511,731 B2 * | 8/2013 | Sakai | .................... | B62D 25/087 296/193.02 |
| 8,657,368 B2 * | 2/2014 | Freeman | ............ | B62D 25/2036 296/203.03 |
| 8,696,050 B2 * | 4/2014 | Nakamura | .............. | B60R 22/18 280/801.2 |
| 9,162,710 B1 * | 10/2015 | Yamamoto | ............. | B62D 25/16 |
| 2005/0093286 A1 * | 5/2005 | Oh | .......................... | B60G 7/02 280/788 |
| 2007/0075568 A1 * | 4/2007 | Kim | .................... | B60R 11/0217 296/193.08 |

(Continued)

FOREIGN PATENT DOCUMENTS

EP 1878640 A1 1/2008
JP 02-147382 U 12/1990

(Continued)

*Primary Examiner* — Kiran B Patel
(74) *Attorney, Agent, or Firm* — McDermott Will & Emery LLP

(57) ABSTRACT

A reinforcing structure for a package tray side member provides a rigid connection between the package tray side member and a vehicle body while enabling the package tray side member to be re-positioned towards a rear end of a vehicle. The package tray side member is re-positioned so as to be located between a rear end of the vehicle and a seat belt retractor and a shock absorber. Upper and lower end portions of the package tray side member are reinforced, and are respectively coupled to a package tray side panel of a vehicle and to a floor upper side member of a floor panel of the vehicle.

9 Claims, 15 Drawing Sheets

(56) References Cited

U.S. PATENT DOCUMENTS

| | | | | |
|---|---|---|---|---|
| 2009/0121510 A1* | 5/2009 | Kim | ................ | B60K 1/04 296/24.33 |
| 2010/0133879 A1* | 6/2010 | Leonetti | ................ | B62D 25/088 296/193.08 |
| 2010/0148538 A1* | 6/2010 | Neumann | ................ | B62D 25/087 296/203.04 |
| 2011/0156447 A1* | 6/2011 | Matsuoka | ................ | B62D 25/087 296/203.04 |
| 2011/0254319 A1* | 10/2011 | Amir | ................ | B62D 25/087 296/193.08 |
| 2013/0181485 A1* | 7/2013 | Rumpel | ................ | B60G 3/20 296/203.04 |
| 2013/0341970 A1* | 12/2013 | Shimizu | ................ | B62D 25/087 296/193.08 |
| 2014/0021748 A1* | 1/2014 | Park | ................ | B62D 25/08 296/203.04 |
| 2014/0152054 A1* | 6/2014 | Yano | ................ | B62D 25/087 296/193.08 |
| 2014/0284968 A1* | 9/2014 | Park | ................ | B62D 25/08 296/193.08 |

FOREIGN PATENT DOCUMENTS

| | | |
|---|---|---|
| JP | 08-175424 A | 7/1996 |
| JP | 2005-170228 A | 6/2005 |
| JP | 2008-238885 A | 10/2008 |

* cited by examiner

US 9,371,092 B2

REINFORCING STRUCTURE OF PACKAGE TRAY SIDE MEMBER FOR VEHICLE

CROSS-REFERENCE TO RELATED APPLICATION

This application claims the benefit under 35 U.S.C. §119(a) of Korean Patent Application No. 10-2012-0144290 filed on Dec. 12, 2012, the entire contents of which are incorporated herein by reference.

BACKGROUND (a) Technical Field

The present invention relates to a reinforcing structure of a package tray side member for a vehicle. More particularly, the present invention relates to a structure for providing a rigid connection between a vehicle body and a package tray side member when the position of the package tray side member is transferred towards a rear end of a vehicle.

(b) Background Art

In general, a package tray for a vehicle is mounted on a backside of a rear seat in a vehicle, so as to support the rear seat and separate an interior compartment of the vehicle from a trunk compartment.

The package tray generally has a structure that includes a package tray panel separating the interior compartment of the vehicle from the trunk compartment, a rear window outer frame attached to a front side of the package tray panel, a lower tray panel welded to a rear end of the package tray panel so as to reduce any impact transferred from a bumper, a package tray panel support member formed in the middle of a lower portion of the package tray panel, and a package tray side panel and a package tray side member, disposed at a side of the package tray panel.

Additionally, a seat belt retractor, a shock absorber, and the like are disposed on the side of the packet tray at which the package tray side member is positioned. Appropriate reinforcing structures for reinforcing the vehicle body and providing rigidity in the lateral direction are also provided to the side of the package tray.

For example, various reinforcing structures for reinforcing the surroundings of a package tray side member have been disclosed in Japanese Patent Application Publication No. 2005-0170228, Japanese Patent Application Publication No. 08-0175424, Japanese Patent Application Publication No. 2008-0238885, and European Patent No. 1,878,640.

FIGS. 1A and 1B are perspective views showing a mounting structure of a conventional package tray side member 2.

As shown in FIG. 1A, a package tray side panel 11, in contact with a front pillar outer upper member, is disposed at the side of a package tray panel 10. A package tray side member 12 extends downward from the package tray side panel 11 and is connected to a wheel housing inner panel 13. Reference numeral 14 represents a floor panel.

As shown in FIG. 1B, in the mounting structure of a conventional package tray side member 2, an upper mount 5 of a shock absorber should be mounted at the outside in order not to interfere with the straightening of the package tray side member 2. Additionally, an aperture 6 for assembling a seat belt retractor (not shown) mounted inside the package tray side member should be formed in the package tray side panel 1. As a result, it is difficult to perform after-sales service (A/S) because of the limited access provided to the seat belt retractor and shock absorber upper mount 5. Additionally, the vehicle body's rigidity is diminished because of the presence of the aperture 6.

SUMMARY OF THE DISCLOSURE

The present invention has been made in an effort to solve the above-described problems associated with prior art. Accordingly, the present invention provides a reinforcing structure of a package tray side member for a vehicle, in which a seat belt retractor and a shock absorber mount are exposed by positioning the package tray side member toward a rear end of the vehicle. Upper and lower end portions of the package tray side member are appropriately reinforced so as to provide rigidity and durability to the package tray side member. By re-positioning the package tray side member towards a rear end of the vehicle, the assembling, mounting, and servicing of the seat belt retractor and the shock absorber mount is facilitated.

In one aspect, the present invention provides a reinforcing structure of a package tray side member for a vehicle, including a package tray side panel mounted to a side portion of a package tray panel for a vehicle and a package tray side member mounted to the side portion of the package tray panel, wherein the package tray side member is coupled to the package tray side panel and to a floor upper side member of a floor panel of the vehicle respectively through upper and lower end portions thereof, and the package tray side member is positioned towards a rear end of the vehicle from the positions of a seat belt retractor and a shock absorber mount.

Accordingly, it is possible to facilitate the assembling, mounting, and servicing of the seat belt retractor and the shock absorber mount and to provide a working space for performing after-sales service (A/S).

The lower end portion of the package tray side member may be disposed between a wheel housing inner panel and the floor upper side member extending upward from the floor panel.

The seat belt retractor may be mounted to a front pillar inner panel of the vehicle, wherein the front pillar inner panel may be exposed as a result of positioning the package tray side member toward the rear end of the vehicle. The shock absorber mount may be mounted inside a wheel housing inner panel of the vehicle, wherein the wheel housing inner panel may be exposed as a result of positioning the package tray side member toward the rear end of the vehicle.

In an exemplary embodiment, a first reinforcement member is provided, the first reinforcement member having two end portions and a middle portion that are welded to the package tray side member, and the wheel housing inner panel being disposed between the package tray side member and the wheel housing inner panel so as to form three box-shaped spaces between the wheel housing inner panel and the package tray side member.

In another exemplary embodiment, a second reinforcement member may be disposed between front and rear members of the package tray side member above the wheel housing inner panel so as to form one box-shaped space between the second reinforcement member and the front and rear members of the package tray side member.

In still another exemplary embodiment, a third reinforcement member may be disposed between front and rear members of the package tray side member at a position adjacent to the wheel housing inner panel, and upper and lower flanges of the third reinforcement member may be connected to the rear member. The third reinforcement member may be connected to the front member and to the wheel housing inner panel so as to form one box-shaped space between the third reinforcement member, the front member, and the wheel housing inner panel.

A second reinforcement member connected to the package tray side member, and an upper flange of the second reinforcement member may be connected to a front pillar outer upper member of the vehicle by passing through a front pillar inner panel, and further be connected to an upper flange of a front pillar outer member.

A rear flange of the front pillar outer member may be continuously welded to the second reinforcement member, the package tray side panel, and the package tray side member from the top to the bottom of the rear flange.

Other aspects and exemplary embodiments of the invention are discussed infra.

In the reinforcing structure of the package tray side member according to the present invention, the position of the package tray side member may be transferred by about 110 mm toward the rear end of the vehicle. Accordingly, it is possible to facilitate the assembling of the seat belt retractor and the shock absorber mount, to provide a working space for A/S, and to reinforce the connection between the vehicle body and the package tray side member using a plurality of reinforcement members mounted at the upper and lower end portions of the package tray side member.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
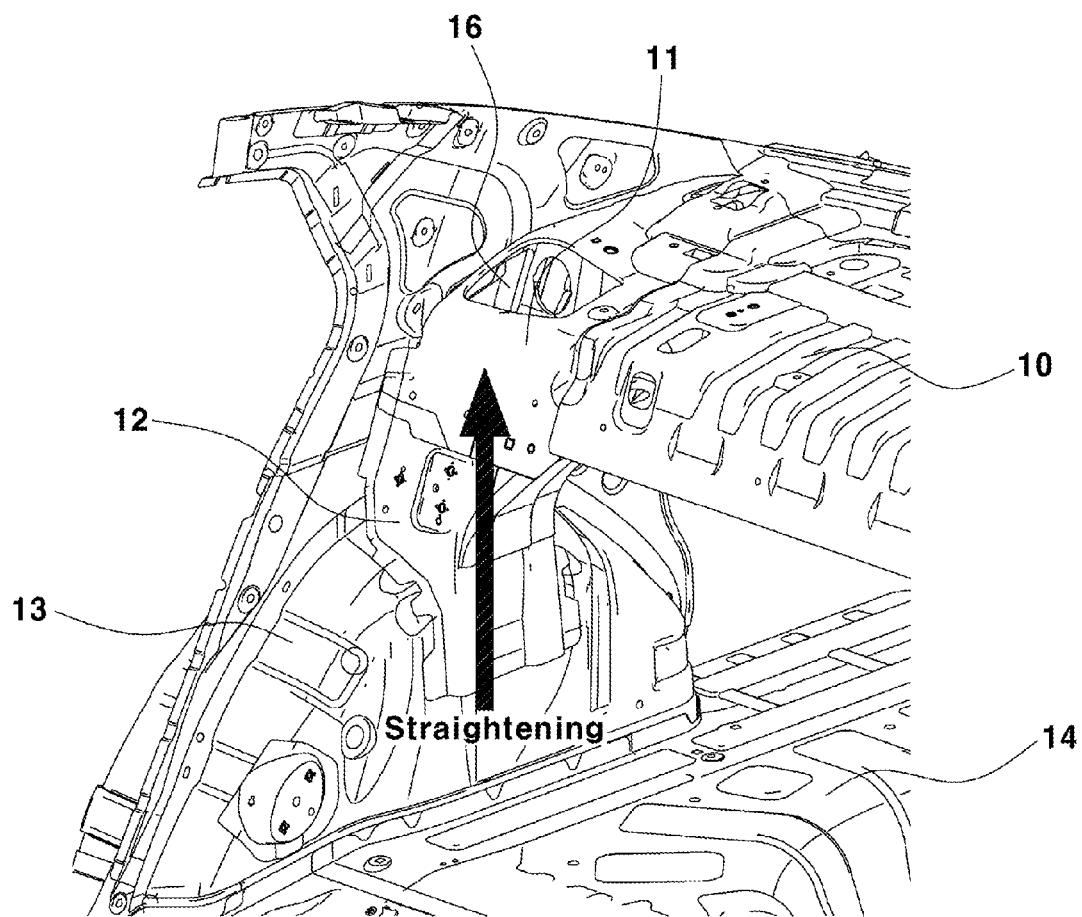
FIGS. 1A and 1B are perspective views showing a mounting structure of a conventional package tray side member.
Figure 1B:
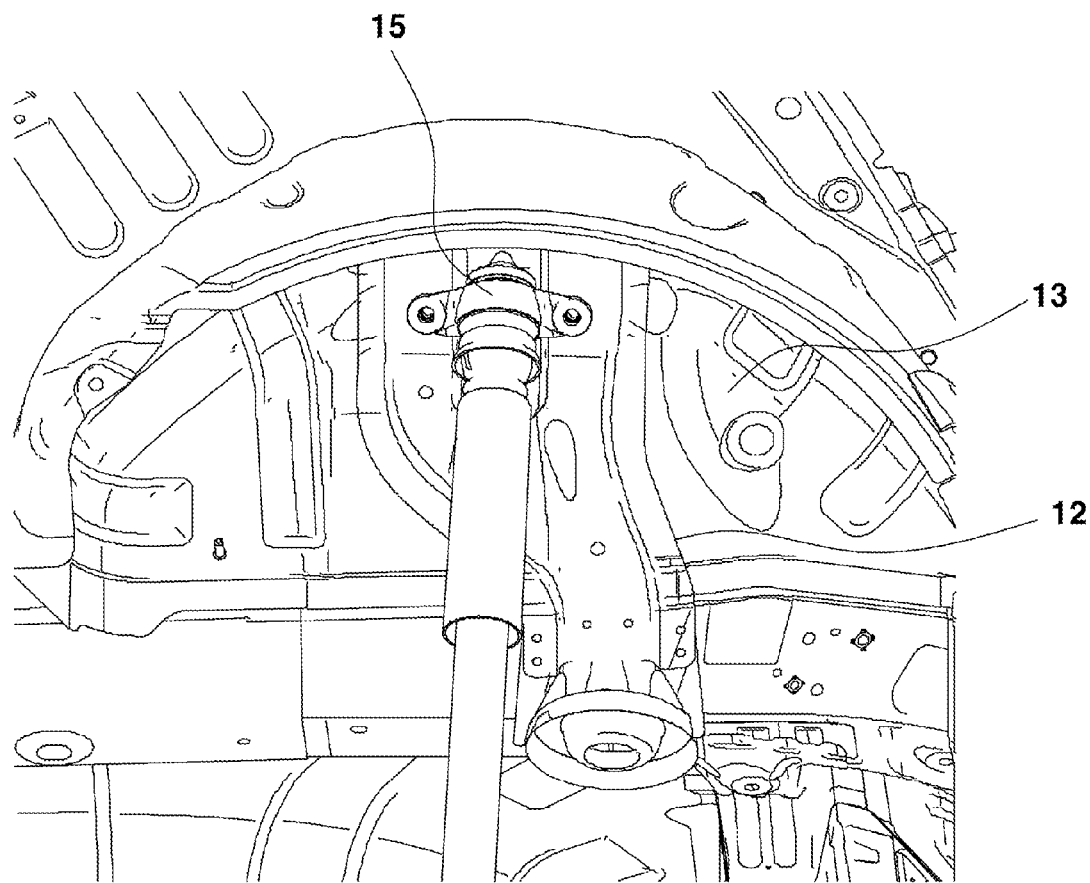

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes may be determined at least in part based on any particular application and use environment of the invention.

In the figures, the same reference numbers may refer to the same or equivalent parts of the present invention throughout the several figures of the drawing.

DETAILED DESCRIPTION

Hereinafter, reference is made in detail to various embodiments of the present invention, examples of which are illustrated in the accompanying drawings and described below. While the invention is described in conjunction with exemplary embodiments, it is to be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2A:
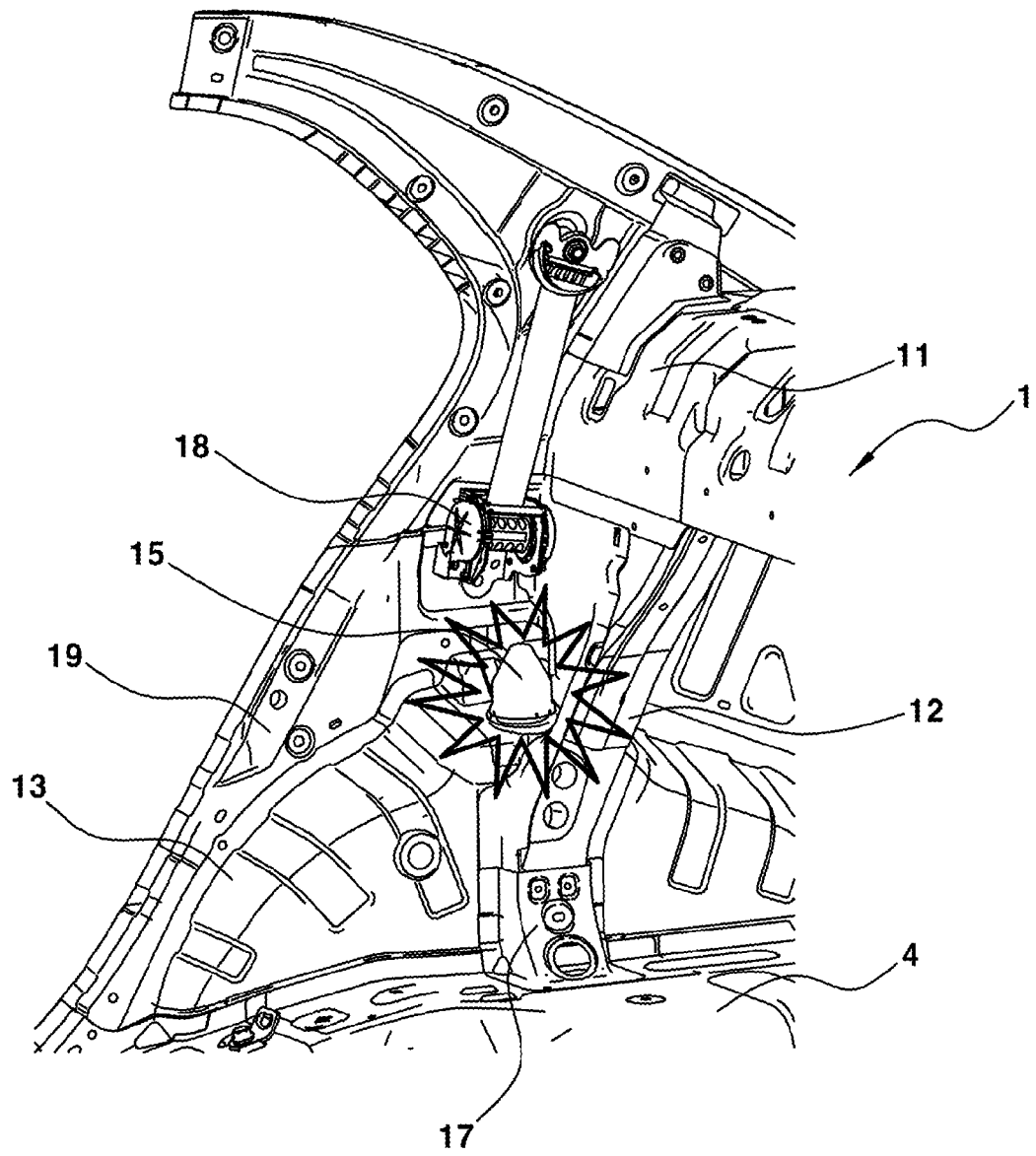
FIGS. 2A and 2B are perspective views showing a reinforcing structure of a package tray side member according to an embodiment of the present invention.
Figure 2B:
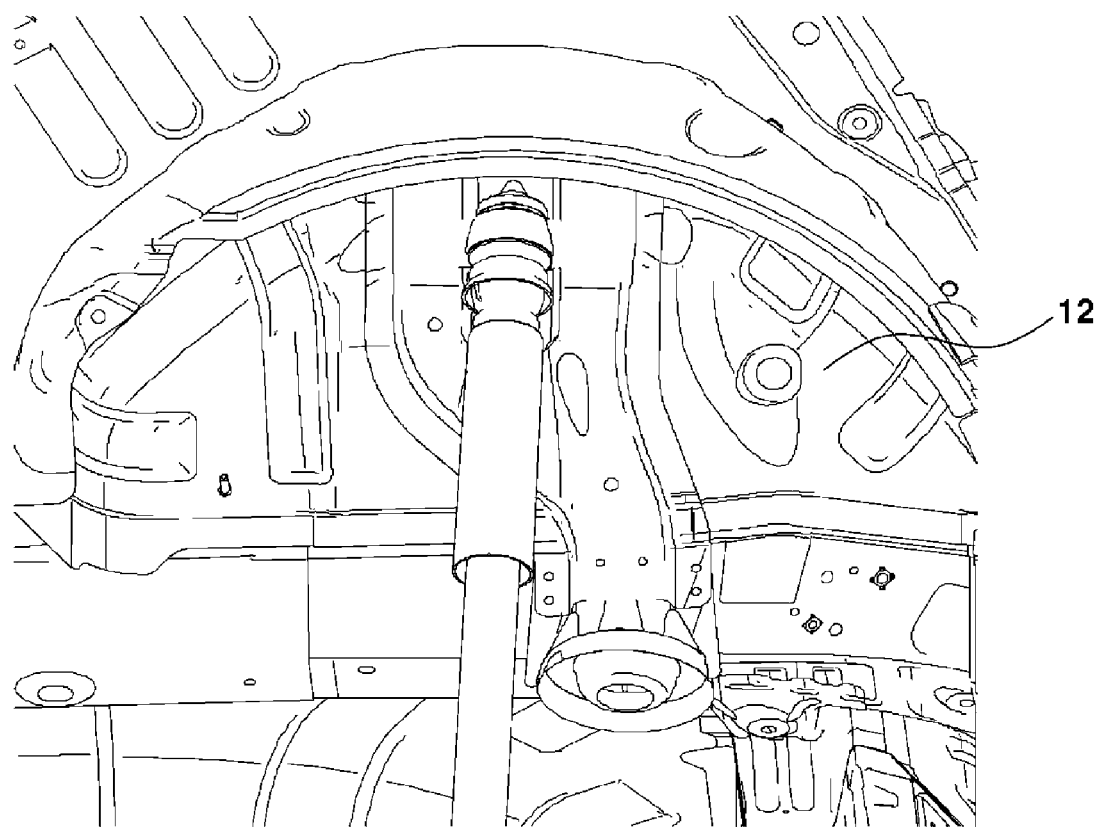

FIGS. 2A and 2B are perspective views showing a reinforcing structure 1 of a package tray side member 12 according to an embodiment of the present invention.

As shown in FIGS. 2A and 2B, in the reinforcing structure of the package tray side member 12, a seat belt retractor 18 and a shock absorber mount 15 are exposed by transferring the position of the package tray side member 12 toward a rear end of a vehicle as compared to the conventional position for a package tray side member 12. In particular, the position of the package tray side member 12 is transferred rearward behind the mounting position of the seat belt retractor 18 and the shock absorber mount 15, such that the seat belt retractor 18 and the shock absorber mount 15 are accommodated inside the interior compartment of the vehicle. As a result, the assembly, mounting, and servicing of the seat belt retractor 18 and the shock absorber mount 15 are facilitated for after-sales service (A/S). In addition, it is possible to reinforce the vehicle body connection structure of the package tray side member 12 when the package tray side member 12 is positioned toward the rear end of the vehicle.

An upper end portion of the package tray side member 12 is welded to a package tray side panel 11, and simultaneously, a lower end portion of the package tray side member 12 is welded to a floor upper side member 17 attached to a floor panel.

The lower end portion of the package tray side member 12 is positioned on a vertical line passing through the position of a shock absorber mount 15, and the package tray side member 12 extends upward along a path bent towards the rear of the vehicle to avoid the shock absorber mount 15 and the seat belt retractor 18. The upper end portion of the package tray side member 12 is connected to the package tray side panel 11.

Accordingly, the package tray side member 12 can be positioned behind the seat belt retractor 18 and the shock absorber mount 15 towards the rear of the vehicle. As a result, a working space for assembling and mounting the seat belt retractor 18 and the shock absorber mount 15 and for performing any A/S is provided by transferring the position of the package tray side member 12 toward the rear end of the vehicle.

As the position of the package tray side member 12 is transferred toward the rear end of the vehicle as described above, the seat belt retractor 18 comes to be positioned on the inside of the vehicle (i.e., the seat belt retractor 18 comes to be positioned within the interior compartment of the vehicle). Thus, the seat belt retractor 18 can be mounted to a front pillar inner panel 19 located inside the vehicle.

The shock absorber mount 15 can also come to be positioned on the inside of the vehicle by transferring the position of the package tray side member 12 toward the rear end of the vehicle. In this configuration, the shock absorber mount 15 can be mounted to the wheel housing inner panel 13.

Figure 3A:
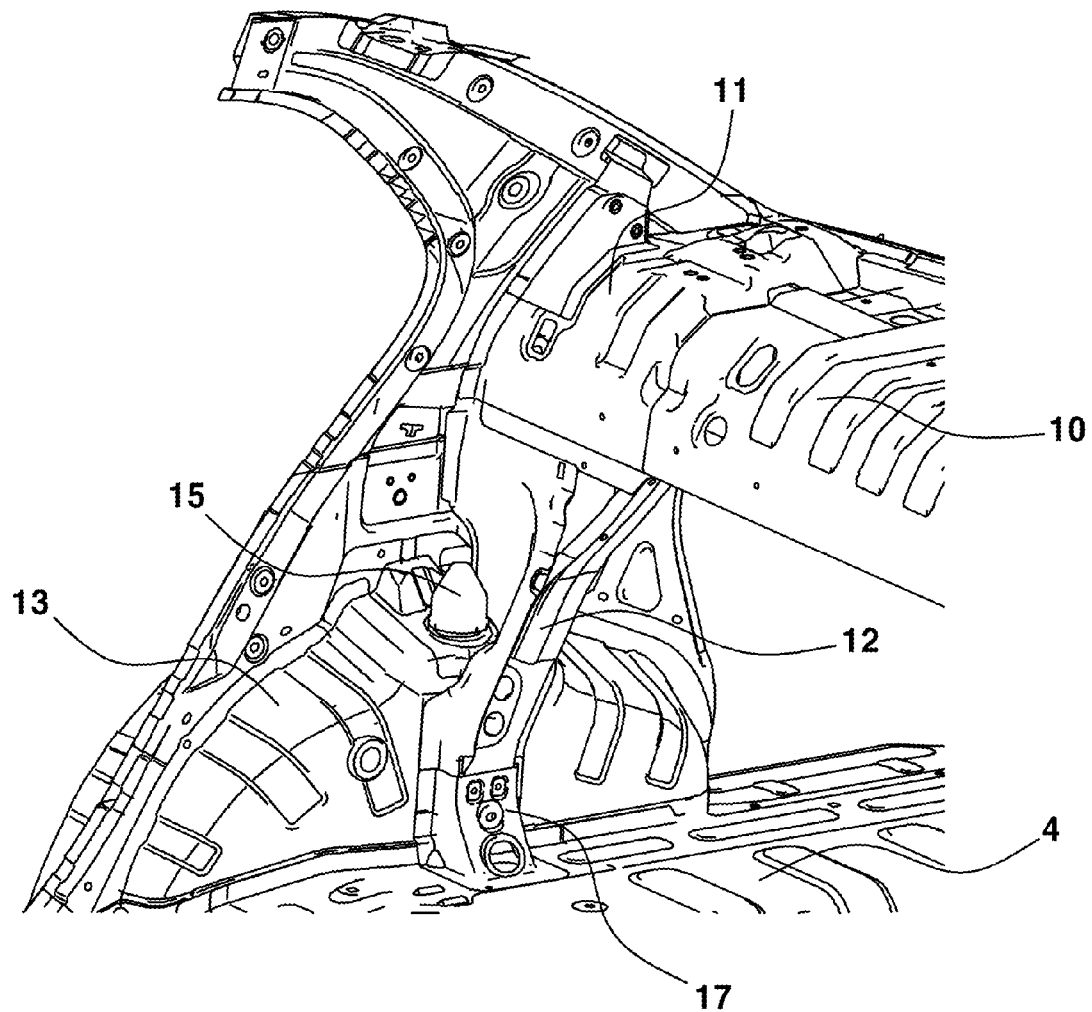
FIGS. 3A and 3B respectively show a perspective view and a cross-sectional view illustrating a mounting structure of a lower end portion of the package tray side member in the reinforcing structure of the package tray side member according to an embodiment of the present invention.
Figure 3B:
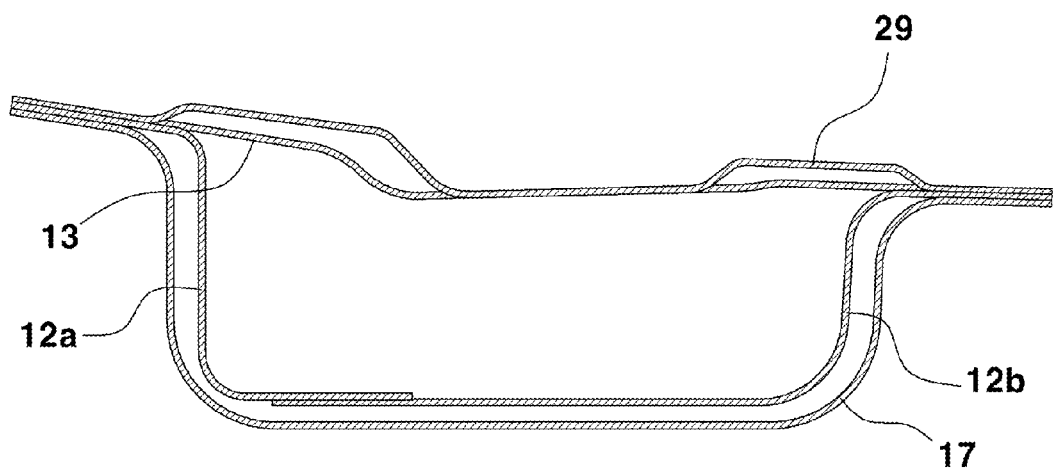

FIGS. 3A and 3B respectively show a perspective view and a cross-sectional view illustrating a mounting structure of the lower end portion of the package tray side member 12 in the reinforcing structure of the package tray side member 12 according to an embodiment of the present invention.

As shown in FIG. 3A, as the position of the package tray side member 12 is transferred toward the rear end of the vehicle, the lower end portion of the package tray side member 12 comes to be positioned below the shock absorber mount 15 where the lower end portion is connected to the floor panel.

To this end, the lower end portion of the package tray side member 12 is mounted so as to be interposed between the wheel housing inner panel 13 and a floor upper side member 17 which extends upward from the floor panel.

In this case, and as shown in the cross-sectional view of FIG. 3B, one end portion of a front member 12*a* of the package tray side member 12 is welded to the wheel housing inner panel 13 and to the floor upper side member 17 while being inserted into a cavity formed between the wheel housing inner panel 13 and the floor upper side member 17. One end portion of a rear member 12*b* of the package tray side member 12 is also welded to the wheel housing inner panel 13 and to the floor upper side member 17 while also being inserted into the cavity formed between the wheel housing inner panel 13 and the floor upper side member 17.

The other end portions of the front and rear members 12*a* and 12*b* (i.e., the end portions of the front member 12*a* and rear member 12*b* that are opposite to the one end of the front member 12*a* and of the rear member 12*b*, respectively, that are welded to the wheel housing inner panel 13 and to the floor upper side member 17) are welded to each other while overlapping with each other, as shown in FIG. 3B.

Thus, the lower end portion of the package tray side member 12 is connected to the floor upper side member 17, and forms a closed section with the wheel housing inner panel 13, thereby providing a secure and rigid connection to the vehicle body.

Reference numeral 29 of FIG. 3B represents a wheel housing inner reinforcement member 29.

Figure 4:
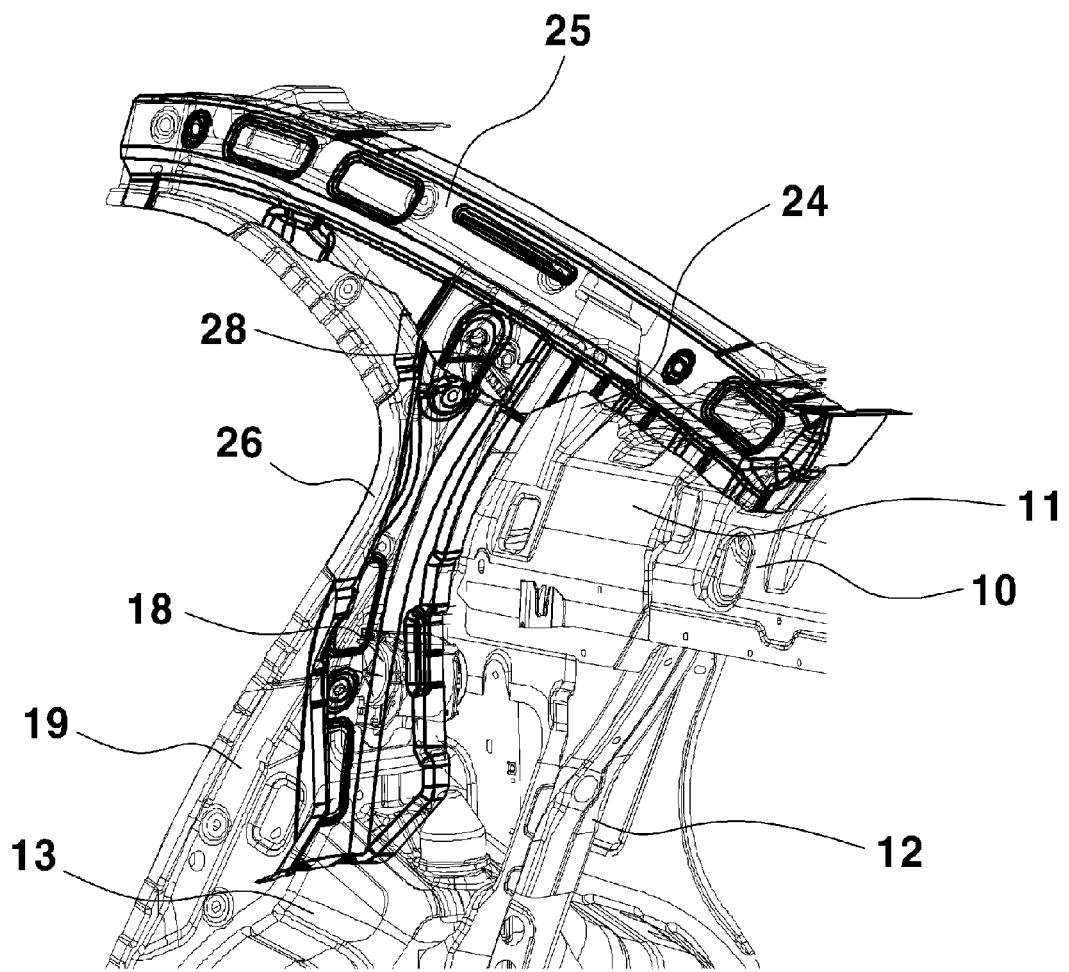
FIG. 4 is a perspective view showing a mounting structure of a seat belt retractor in the reinforcing structure of the package tray side member according to an embodiment of the present invention.

FIG. 4 is a perspective view showing a mounting structure of the seat belt retractor 18 in the reinforcing structure of the package tray side member 12 according to an embodiment of the present invention.

As shown in FIG. 4, in the internal mounting structure of the package tray side member 12, the seat belt retractor 18 is mounted to the side of the front pillar inner panel 19, thereby securing a space for a second reinforcement member 24 described in more detail below.

In order to mount the seat belt retractor 18 to the side of the front pillar inner panel 19, the position of the package tray side member 12 is transferred toward the rear end of the vehicle from the upper end portion of the wheel housing inner panel 13.

The rigidity of the vehicle body is generally diminished by transferring the position of the package tray side member 12 toward the rear end of the vehicle and reducing the cross-sectional area of the package tray side member 12. However, it is nonetheless possible to provide sufficient vehicle body rigidity by providing a reinforcing structure in the present invention.

The package tray side panel 11, the package tray side member 12, a front pillar outer member 26, and a front pillar outer upper member 25 are welded to the second reinforcement member 24, based on the front pillar inner panel 19, by adding the second reinforcement member 24 to the upper end portion of the package tray side panel 11. Thus, it is possible to provide increased rigidity to the connection between the vehicle body and the package tray side member 12.

Accordingly, it is possible to improve the layout of seats and the capacity of a luggage compartment by reducing the cross-sectional area of the package tray side member 12 by 30% as compared to a front pillar portion.

Figure 5A:
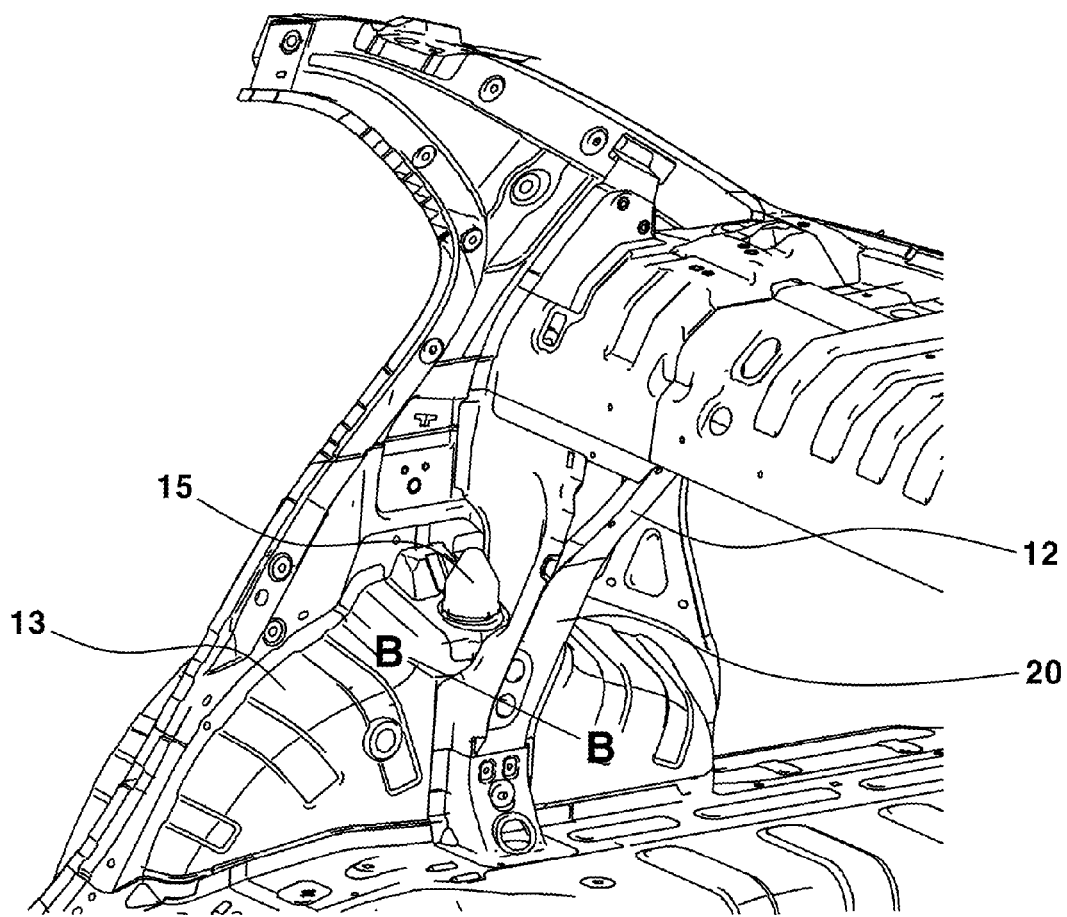
FIGS. 5A and 5B respectively show a perspective view and a cross-sectional view illustrating mounting structures of a first reinforcement member in the reinforcing structure of the package tray side member according to an embodiment of the present invention.
Figure 5B:
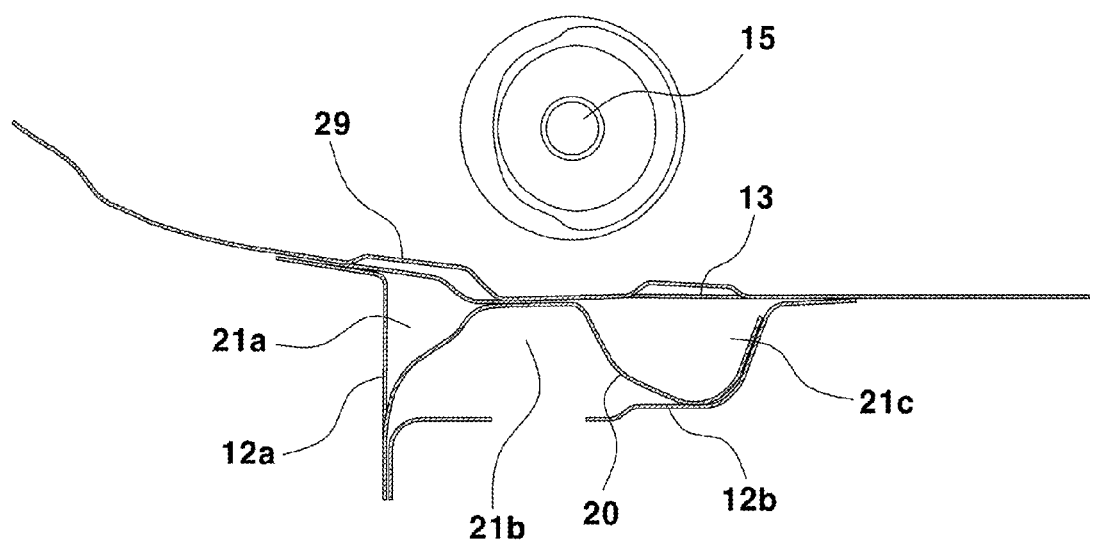

FIGS. 5A and 5B respectively show a perspective view and a cross-sectional view illustrating a mounting structure of the first reinforcement member 24 in the reinforcing structure of the package tray side member 12 according to an embodiment of the present invention. In particular, FIG. 5B shows a cross-sectional view taken along the axis B-B shown in FIG. 5A.

As shown in FIG. 5B, the wheel housing inner panel 13 and the wheel housing inner reinforcement member 29, which can form three box sections, are welded to each other by applying the wheel housing inner reinforcement member 29 to the lower end portion of the wheel housing inner panel 13.

The first reinforcement member 20 is disposed in parallel between the package tray side member 12 and the wheel housing inner panel 13, based on the section of the first reinforcement member 20. Three portions, i.e., both end portions and a middle portion of the first reinforcement member 20 disposed as described above are welded to the side of the package tray side member 12 and the side of the wheel housing inner panel 13.

Thus, three box-shaped spaces 21*a*, 21*b* and 21*c* can be formed by attaching the first reinforcement member 20 to the wheel housing inner panel 13 and to the package tray side member 12. Accordingly, it is possible to provide rigidity to the vehicle body and to a middle portion of the package tray side member 12, e.g., a portion of the package tray side member 12 that is located at approximately the same height as the shock absorber mount 15.

Figure 6A:
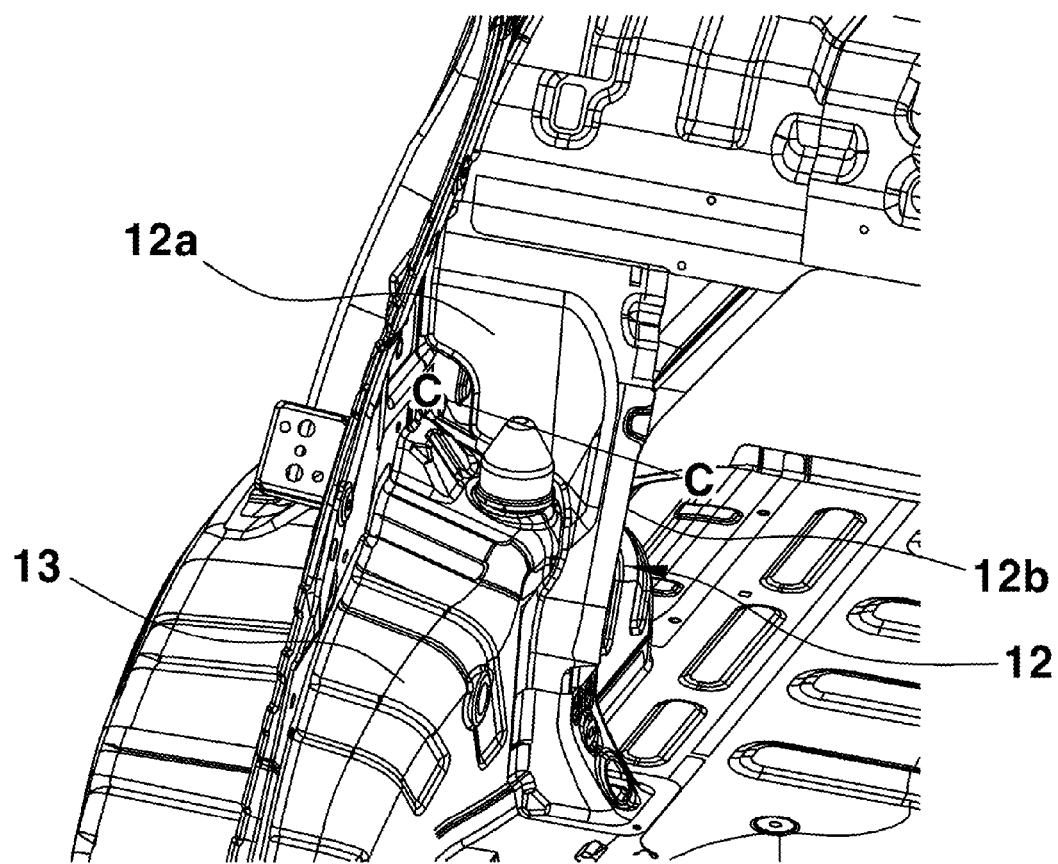
FIGS. 6A and 6B respectively show a perspective view and a cross-sectional view illustrating mounting structures of a first reinforcement member in the reinforcing structure of the package tray side member according to an embodiment of the present invention.
Figure 6B:
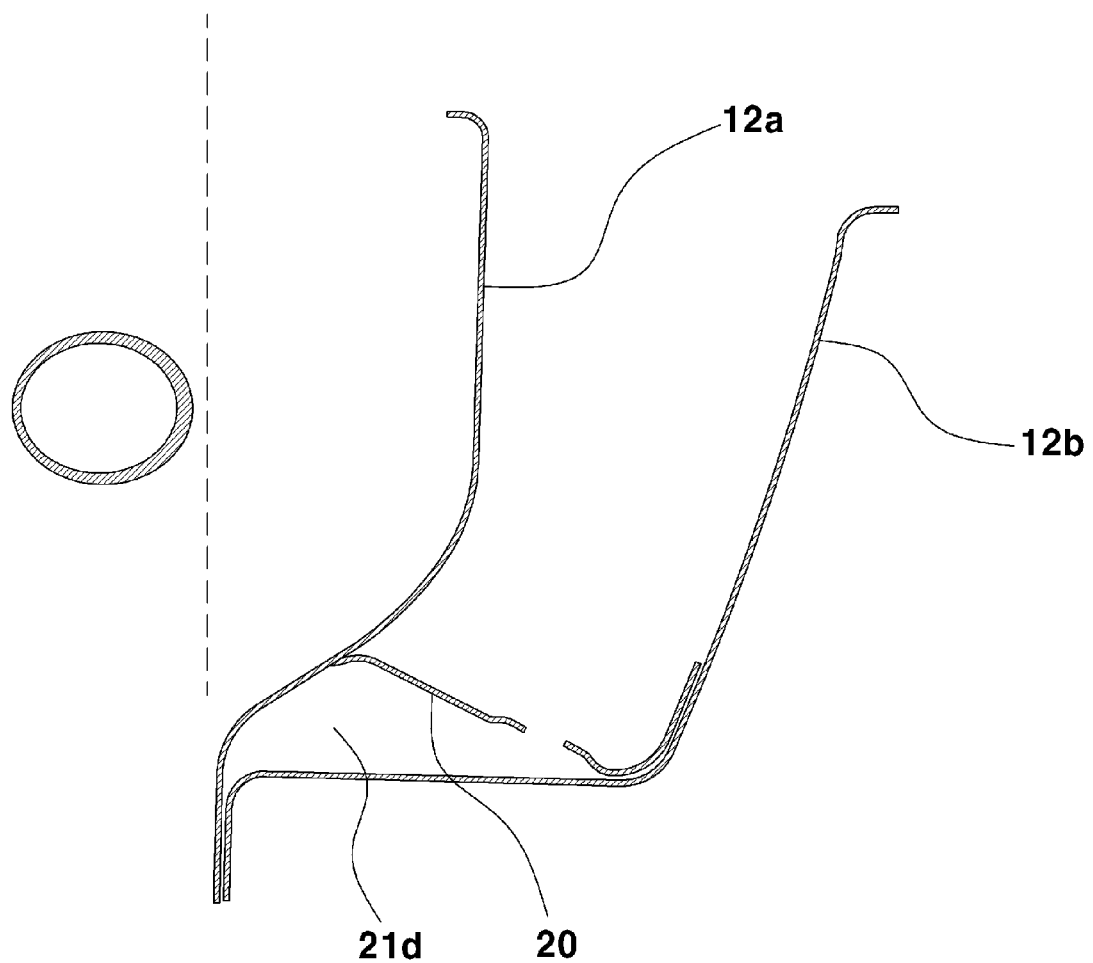

FIGS. 6A and 6B respectively show a perspective view and a cross-sectional view illustrating a mounting structure of the first reinforcement member 20 in the reinforcing structure of the package tray side member 12 according to an embodiment of the present invention. In particular, FIG. 6B shows a cross-sectional view taken along the axis C-C shown in FIG. 6A.

As shown in FIG. 6B, a box-shaped space 21*d* is formed by attaching the reinforcement member 20 to the front member 12*a* of the package tray side member 12 toward the rear end of the vehicle from the upper end portion of the wheel housing inner panel 13.

To this end, the first reinforcement member 20 is mounted inside the space between the front and rear members 12*a* and 12*b* of the package tray side member 12 positioned upward from the wheel housing inner panel 13.

Both end portions of the first reinforcement member 20 mounted as described above are welded to the respective front and rear members 12a and 12b, thereby forming a box-shaped space 21d between the front and rear members 12a and 12b.

Figure 7A:
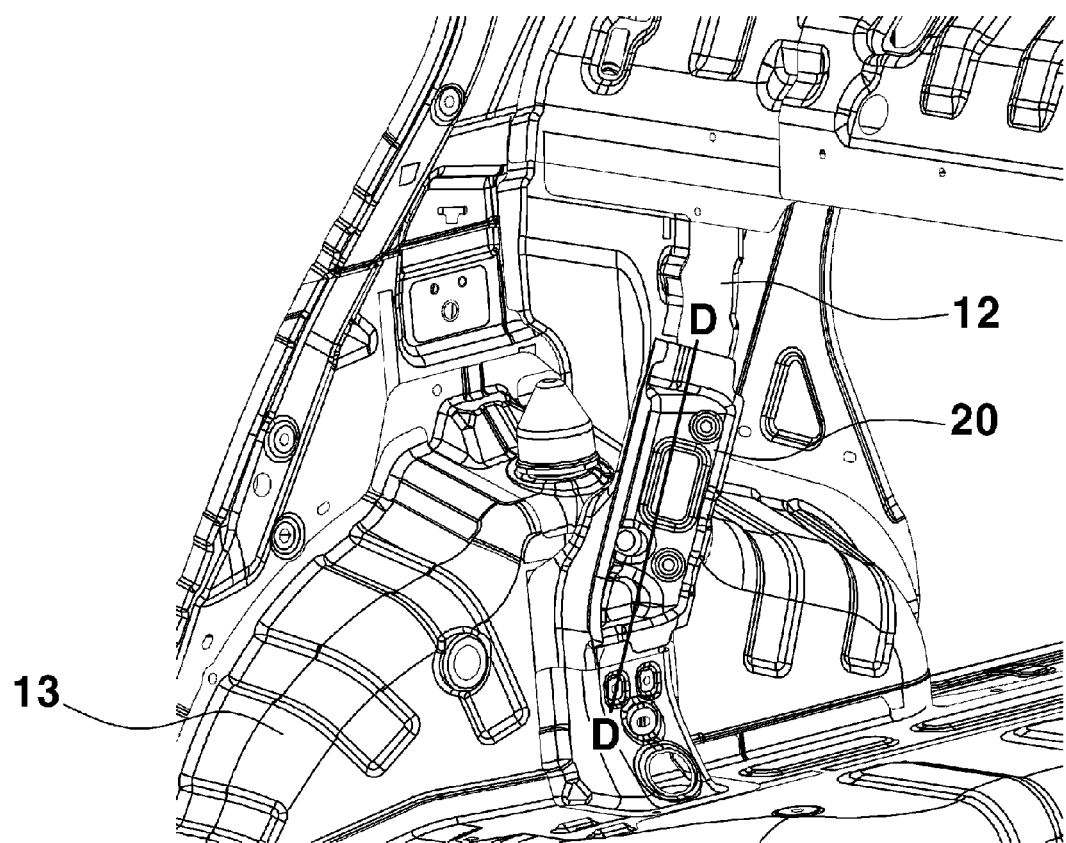
FIGS. 7A and 7B respectively show a perspective view and a cross-sectional view illustrating mounting structures of a first reinforcement member in the reinforcing structure of the package tray side member according to an embodiment of the present invention.
Figure 7B:
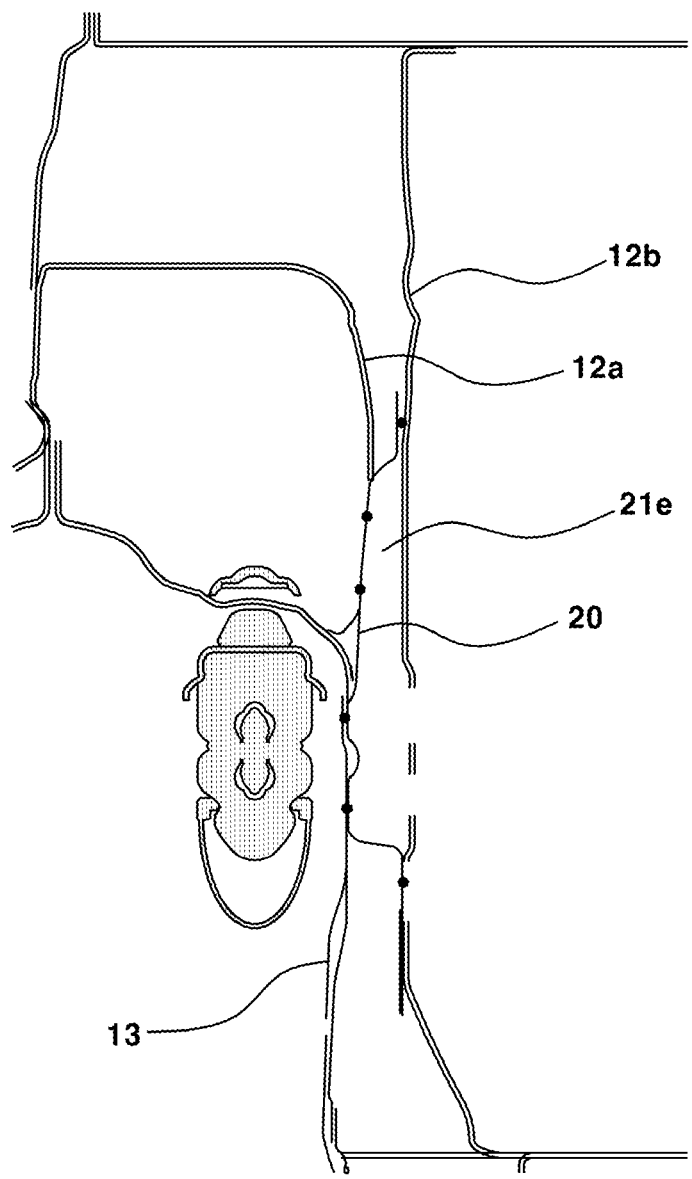

FIGS. 7A and 7B respectively show a perspective view and a cross-sectional view illustrating a mounting structure of the first reinforcement member 20 in the reinforcing structure of the package tray side member 12 according to an embodiment of the present invention. In particular, FIG. 7B shows a cross-sectional view taken along the axis D-D shown in FIG. 7A.

As shown in FIGS. 7A and 7B, the first reinforcement member 20 is mounted between the front and rear members 12a and 12b of the package tray side member 12 positioned sideward from the wheel housing inner panel 13.

The first reinforcement member 20 mounted as described above is welded to the front member 12a disposed upward therefrom and to the wheel housing inner panel 13 disposed downward therefrom. In addition, upper and lower flanges of the first reinforcement member 20 are welded to the rear member 12b.

Accordingly, a box-shaped space 21e can be formed between the first reinforcement member 20 and the rear member 12b.

Flanges are formed at upper and lower end portions of the reinforcement member 20, respectively, and welded to the rear member 12b, thereby forming a closed space 21e between the reinforcement member 20 and the rear member 12b of the package tray side member 12.

In this case, the front end portion of the reinforcement member 20 is connected to the front member 12a of the package tray side member 12, and the side portion of the reinforcement member 20 comes into contact with the wheel housing inner panel 12 and the wheel housing inner reinforcement member 29.

Figure 8:
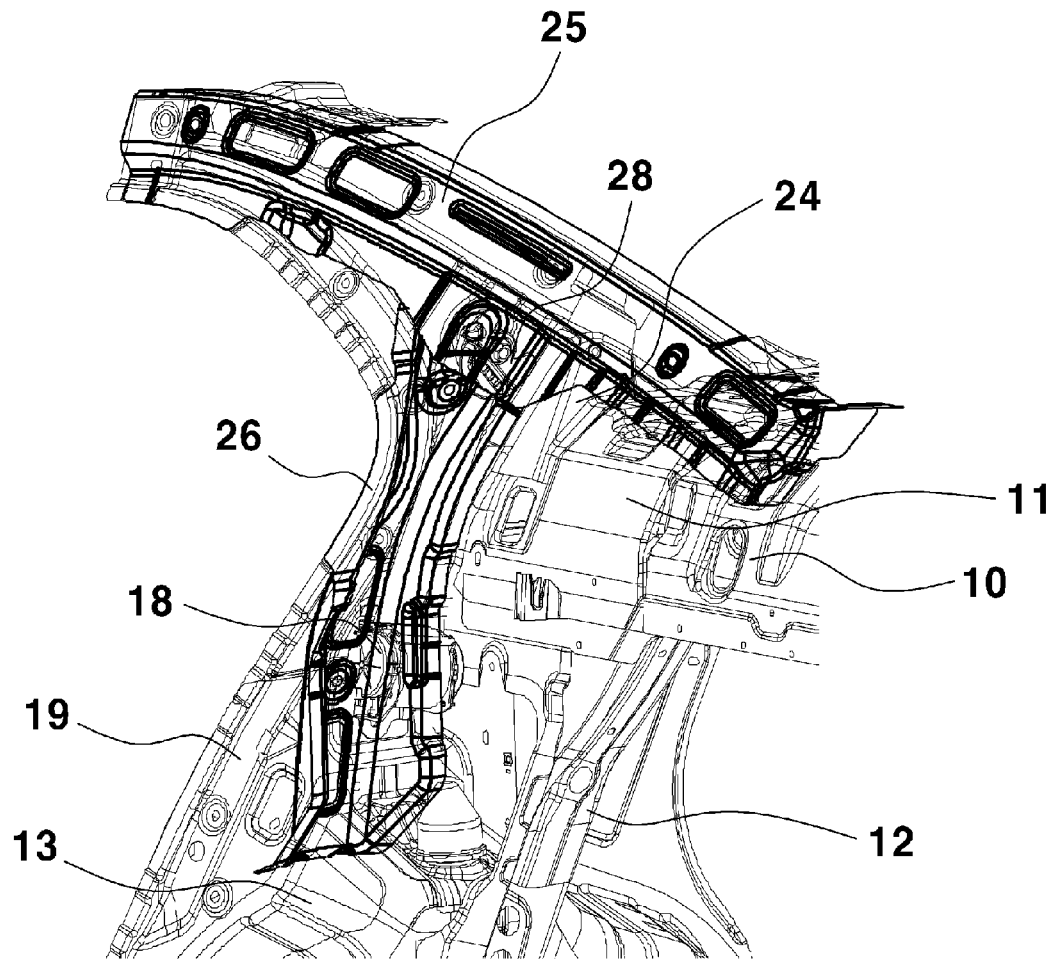
FIG. 8 is a perspective view showing a state in which mounting faces for the seat belt retractor and a seat belt D-ring are secured in the reinforcing structure of the package tray side member according to an embodiment of the present invention.

FIG. 8 is a perspective view showing an example in which mounting faces for the seat belt retractor 18 and a seat belt D-ring 28 are secured in the reinforcing structure of the package tray side member 12 according to an embodiment of the present invention.

As shown in FIG. 8, the mounting faces of the seat belt retractor 18 and of the seat belt D-ring 28 can be secured by transferring the position of the package tray side member 12 toward the rear end of the vehicle.

As the position of the package tray side member 12 is transferred toward the rear end of the vehicle, the vehicle body torsion rigidity is weakened due to the bending of the member 12 and the reduction in cross-sectional size of the member 12 (decrease in width by 30%). However, The rearwards shift of the package tray side member 12 makes it possible to improve the layout of seats and the capacity of a luggage compartment in the vehicle.

Figure 9:
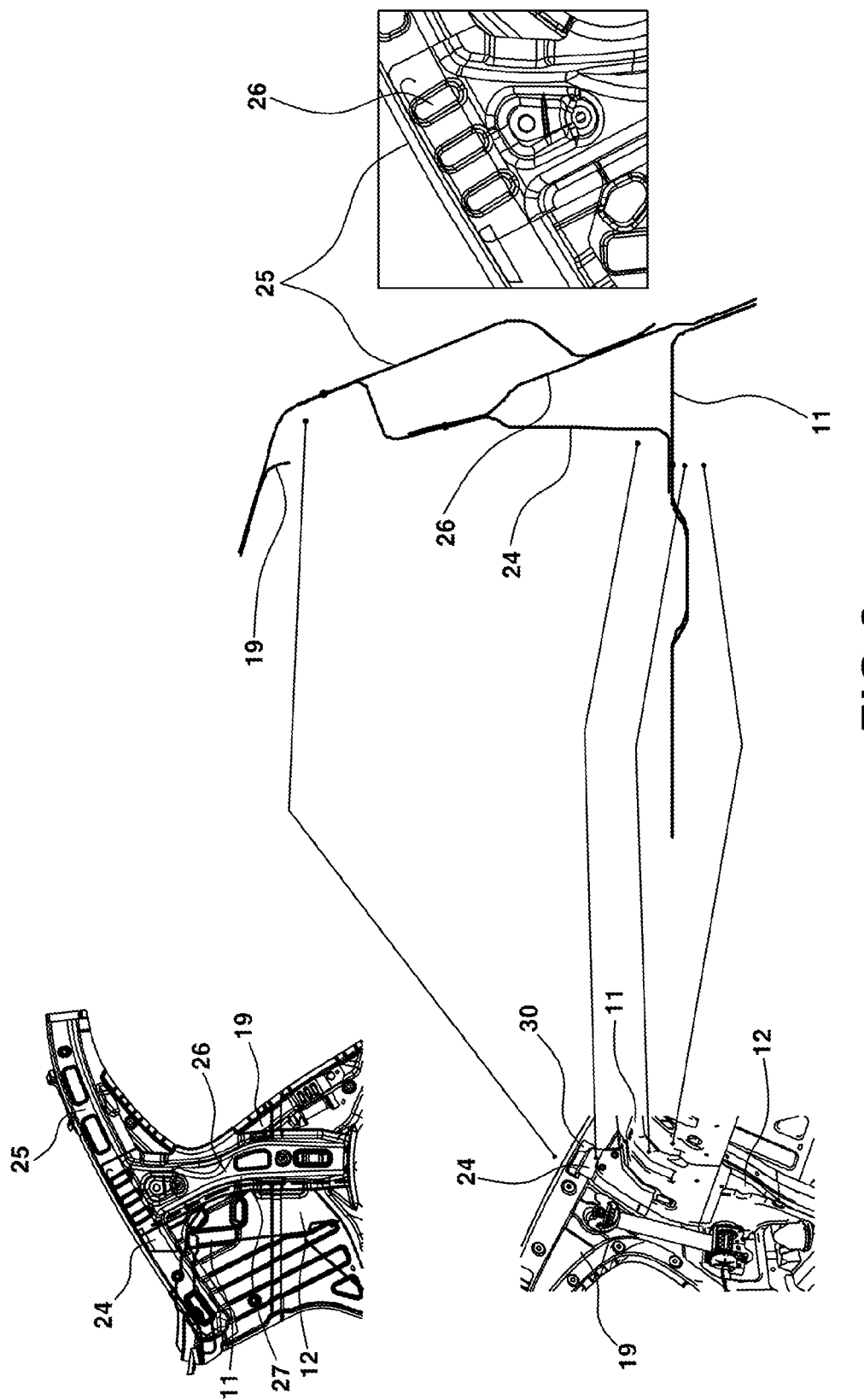
FIG. 9 shows combined perspective and cross-sectional views illustrating a reinforcing structure of an upper end portion of the package tray side member in the reinforcing structure of the package tray side member according to an embodiment of the present invention.

FIG. 9 shows combined perspective and cross-sectional views illustrating a reinforcing structure of the upper end portion of the package tray side member 12 in the reinforcing structure of the package tray side member 12 according to an embodiment of the present invention.

As shown in FIG. 9, the second reinforcement member 24 having an erect posture is welded to the side of the package tray side panel 11.

An upper flange of the second reinforcement member 24 is connected to the front pillar outer upper member 25 by passing through an aperture 30 formed in the front pillar inner panel 19. In addition, the upper flange of the second reinforcement member 24 is welded together with an upper flange of the front pillar outer member 26.

Particularly, a rear flange 27 of the front pillar outer member 26 is continuously welded to the second reinforcement member 24, the package tray side panel 11, and the package tray side member 12 from the top to the bottom of the rear flange 27. In the example shown in FIG. 9, the continuous weld is shown as a dotted line substantially extending along the full length of the rear flange 27 of the front pillar outer member 26 so as to extend along sections of the rear flange 27 that contact each of the second reinforcement member 24, the package tray side panel 11, and the package tray side member 12.

The package tray side panel 11 (package tray side upper panel+package tray side lower panel) is welded to the second reinforcement member 24, and the lower end portion of the assembly welded as described above is welded to the package tray side member 12.

The flange of the second reinforcement member 24, which forms the upper end portion of the assembly, is welded to the front pillar outer upper member 25 by passing through the front pillar inner panel 19.

In this case, the flange of the second reinforcement member 20 is also welded to the upper flange of the front pillar outer member 26.

When being connected to the front pillar outer member 26 positioned outward from the front pillar inner panel 19, the assembly is continuously welded to the rear flange of the front pillar outer member 26, thereby providing increased rigidity to connection to the vehicle body.

As described above, in the present invention the structure obtained by transferring the position of the package tray side member 12 toward the rear end of the vehicle, and the structure obtained by reinforcing the package tray side member 12, are simultaneously implemented. Accordingly, it is possible to facilitate the assembling of the seat belt retractor 18 and of the shock absorber mount 15, to easily receive the A/S, and to reinforce and provide increased rigidity to the connection between the vehicle body and the package tray side member 12.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A reinforcing structure of a package tray side member for a vehicle, comprising:
    a package tray side panel mounted at a side of a package tray panel for a vehicle; and
    a package tray side member mounted at the side of the package tray panel,
    wherein the package tray side member is coupled to the package tray side panel and to a floor upper side member of a floor panel of the vehicle respectively through upper and lower end portions thereof, and the package tray side member is positioned towards a rear end of the vehicle from the positions of a seat belt retractor and a shock absorber mount.

2. The reinforcing structure of claim 1, wherein the seat belt retractor is mounted to a front pillar inner panel of the vehicle.

3. The reinforcing structure of claim 1, wherein the shock absorber mount is mounted inside a wheel housing inner panel of the vehicle.

4. The reinforcing structure of claim 1, wherein the lower end portion of the package tray side member is disposed between a wheel housing inner panel and the floor upper side member extending upward from the floor panel.

5. The reinforcing structure of claim 1, further comprising:
a first reinforcement member having two end portions and a middle portion that are welded to the package tray side member,
wherein the wheel housing inner panel is disposed between the package tray side member and the wheel housing inner panel so as to form three box-shaped spaces between the wheel housing inner panel and the package tray side member.

6. The reinforcing structure of claim 1, further comprising:
a second reinforcement member disposed between front and rear members of the package tray side member above the wheel housing inner panel so as to form one box-shaped space between the second reinforcement member and the front and rear members of the package tray side member.

7. The reinforcing structure of claim 1, further comprising:
a third reinforcement member disposed between front and rear members of the package tray side member at a position located adjacent to the wheel housing inner panel,
wherein upper and lower flanges of the third reinforcement member are connected to the rear member, the third reinforcement member is connected to the front member and to the wheel housing inner panel so as to form one box-shaped space between the third reinforcement member, the front member, and the wheel housing inner panel.

8. The reinforcing structure of claim 1, further comprising:
a second reinforcement member connected to the package tray side member, and
an upper flange of the second reinforcement member connected to a front pillar outer upper member of the vehicle by passing through a front pillar inner panel, and connected to an upper flange of a front pillar outer member.

9. The reinforcing structure of claim 8, wherein a rear flange of the front pillar outer member is continuously welded to the second reinforcement member, the package tray side panel, and the package tray side member from the top to the bottom of the rear flange.

* * * * *